United States Patent
Sielemann et al.

(10) Patent No.: US 10,253,450 B2
(45) Date of Patent: Apr. 9, 2019

(54) FINISHING AGENT WITH BLOCKED POLYISOCYANATES

(71) Applicant: RUDOLF GMBH, Geretsried (DE)

(72) Inventors: Dirk Sielemann, Wolfratshausen (DE); Christine Albert, Bruckmuehl (DE); Gunther Duschek, Benediktbeuern (DE)

(73) Assignee: RUDOLF GMBH, Geretsried (DE)

( * ) Notice: Subject to any disclaimer, the term of this patent is extended or adjusted under 35 U.S.C. 154(b) by 0 days.

(21) Appl. No.: 15/039,174

(22) PCT Filed: Nov. 24, 2014

(86) PCT No.: PCT/EP2014/075397
§ 371 (c)(1),
(2) Date: May 25, 2016

(87) PCT Pub. No.: WO2015/078811
PCT Pub. Date: Jun. 4, 2015

(65) Prior Publication Data
US 2017/0022657 A1 Jan. 26, 2017

(30) Foreign Application Priority Data
Nov. 26, 2013 (DE) .................. 10 2013 224 140

(51) Int. Cl.
*C08G 18/28* (2006.01)
*C08G 18/79* (2006.01)
*C08G 18/80* (2006.01)
*C08L 33/16* (2006.01)
*C08L 75/04* (2006.01)
*C08F 220/24* (2006.01)
*C09D 175/04* (2006.01)
*D06M 13/395* (2006.01)
*D06M 15/277* (2006.01)
*D06M 15/564* (2006.01)

(52) U.S. Cl.
CPC ......... *D06M 13/395* (2013.01); *C08G 18/283* (2013.01); *C08G 18/2825* (2013.01); *C08G 18/792* (2013.01); *C08G 18/808* (2013.01); *C08L 75/04* (2013.01); *C09D 175/04* (2013.01); *D06M 15/277* (2013.01); *D06M 15/564* (2013.01); *C08F 220/24* (2013.01); *D06M 2200/11* (2013.01); *D06M 2200/12* (2013.01)

(58) Field of Classification Search
CPC ........ C08L 75/04; C08L 33/16; C08F 220/24; C08G 18/808; C08G 18/2825; C08G 18/283; C08G 18/792; C09D 175/04; D06M 13/395; D06M 15/564; D06M 15/277; D06M 2200/12; D06M 2200/11
See application file for complete search history.

(56) References Cited

U.S. PATENT DOCUMENTS

| | | |
|---|---|---|
| 2,927,090 A | 3/1960 | Hiestand et al. |
| 4,098,701 A | 7/1978 | Burrill et al. |
| 4,154,714 A | 5/1979 | Hechtl et al. |
| 4,555,419 A | 11/1985 | Huhn et al. |
| 4,780,101 A | 10/1988 | Watanabe et al. |
| 5,910,557 A | 6/1999 | Audenaert et al. |
| 6,437,077 B1 | 8/2002 | Danner et al. |
| 6,843,933 B2 | 1/2005 | Guertler et al. |
| 6,965,007 B1 | 11/2005 | Charriere et al. |
| 7,176,254 B2 | 2/2007 | Rische et al. |
| 2002/0055602 A1 | 5/2002 | Gerle et al. |
| 2003/0232199 A1 | 12/2003 | Rische et al. |
| 2003/0232953 A1 | 12/2003 | Gurtler et al. |
| 2004/0162387 A1 | 8/2004 | Rische et al. |
| 2005/0085573 A1 | 4/2005 | Duschek et al. |
| 2006/0116502 A1 | 6/2006 | Gurtler et al. |
| 2006/0151739 A1 | 7/2006 | Sandner et al. |
| 2010/0190397 A1* | 7/2010 | Duschek ............ C08G 18/3206 442/59 |

FOREIGN PATENT DOCUMENTS

| | | |
|---|---|---|
| CN | 86107140 A | 4/1987 |
| CN | 1218483 A | 6/1999 |
| CN | 1317026 A | 10/2001 |
| CN | 1468879 A | 1/2004 |
| DE | 1 017 133 B | 10/1957 |
| DE | 3 332 997 A1 | 3/1985 |
| DE | 1 021 1549 A1 | 10/2003 |
| DE | 102 26 931 A1 | 12/2003 |
| DE | 10 306 243 A1 | 8/2004 |
| DE | 699 27 679 T2 | 4/2006 |
| DE | 10 2007 020 790 A1 | 11/2008 |
| EP | 1 184 400 A1 | 3/2002 |
| EP | 1 375 552 A1 | 1/2004 |
| EP | 1375550 A1 | 1/2004 |
| EP | 1681324 | 7/2006 |
| EP | 1 375 551 B1 | 11/2006 |
| EP | 1 485 533 B1 | 7/2008 |
| EP | 1 298 180 B1 | 8/2009 |
| EP | 1 629 149 B1 | 9/2009 |
| EP | 2 057 201 B1 | 12/2009 |
| EP | 2 152 957 B1 | 9/2010 |
| EP | 2 599 848 A1 | 6/2013 |
| JP | 2006-152302 | 6/2006 |
| WO | 86/02115 A1 | 4/1986 |
| WO | 2008/135208 A1 | 11/2008 |

OTHER PUBLICATIONS

Bach et al., "Neuen Blockierungsmitteln auf der Spur", Farbe & Lack, Vincentz Network, vol. 12, 2003, pp. 32 w/ English language summary.

(Continued)

*Primary Examiner* — Rabon A Sergent
(74) *Attorney, Agent, or Firm* — Greenblum & Bernstein, P.L.C.

(57) ABSTRACT

The invention relates to preparations containing at least one blocked polyisocyanate and at least one oleophobic and/or hydrophobic finishing agent, and to the use of said preparation for the oleophobic and/or hydrophobic finishing of sheet material, in particular textiles.

17 Claims, No Drawings

(56) References Cited

OTHER PUBLICATIONS

International Search Report issued with respect to application No. PCT/EP2014/075397, dated Mar. 25, 2015.
International Preliminary Report on Patentability issued with respect to application No. PCT/EP2014/075397, dated May 31, 2016.
Office Action dated May 26, 2017 in corresponding Chinese Application No. 201480074050.2 with English translation of the Chinese Office Action.

* cited by examiner

FINISHING AGENT WITH BLOCKED POLYISOCYANATES

The invention relates to preparations containing at least one blocked polyisocyanate and at least one oleophobic and/or hydrophobic finishing agent, and to the use of said preparation for the oleophobic and/or hydrophobic finishing of fabrics, in particular textiles.

In order to create water- or oil-repellent effects on textiles preparations are generally used based on organopolysiloxanes, polyurethanes, modified melamine resins, waxes, paraffin and/or fluorocarbon polymers.

Whereas with fluorine-free preparations only hydrophobic treatment can be achieved, fluorine-containing preparations can also provide oil repellency. The hydrophobic and oleophobic finishing of fluorine-based preparations is normally based on fluorocarbon polymers, in particular on polyurethane- or poly(meth)acrylate systems, containing perfluoroalkyl groups.

The poly(meth)acrylate systems used usually have a perfluoroalkyl(meth)acrylate monomer structure. Since these monomers are the result of a telomerisation process, in the main mixtures of monomers with perfluoroalkyl radicals of different chain lengths ($C_4$-$C_{10}$) are used. Previously monomer mixtures have preferably been used having a perfluoroalkyl radical with an average of eight carbon atoms.

For ecological and/or toxicological reasons, however, these days a switch is being made to the use of fluorinated monomer building blocks, having perfluoroalkyl radicals with a maximum of six carbon atoms. Such monomers or polymers are described, for example in EP 2057201 and EP 1298180.

Apart from the perfluorinated monomers non-fluorinated comonomers such as $C_{12-22}$-alkyl(meth)acrylates, vinyl chloride, vinylidene chloride and/or styrene are used for the synthesis of oleophobic and hydrophobic agents. Furthermore, comonomers containing a cross-linkable group are used. A cross-linkable group is able to react with the fabric to be finished and/or an external crosslinking agent (multifunctional bond).

The polyurethane systems used for oleo- and hydrophobic treatment are produced from fluortelomer alcohols. Here polyisocyanates or prepolymers containing isocyanate groups are reacted with fluortelomer alcohols.

Both the poly(meth)acrylate and also the polyurethane systems, based on monomers having a maximum of six perfluorinated carbon atoms, prove to have a lower effect level than preparations based on monomer building blocks having an average of eight perfluorinated carbon atoms. This can be attributed to the fact that the perfluorinated C6-alkyl radical has a less pronounced crystallisation behaviour.

Apart from the systems containing fluorine, there are also fluorine-free preparations allowing hydrophobic, but not an oleophobic, effects to be achieved. Thus aqueous emulsions of hydrophobic substances are often used. These can involve, for example, polyethylene, paraffin, Fischer-Tropsch waxes or metal soaps. Natural greases and waxes such as carnauba wax, beeswax or lanolin can also be used. Thus from DE 10211549 preparations are known, consisting of a synthetic or natural wax component (e.g. beeswax, carnauba wax, polyethylene wax or Fischer-Tropsch wax) and a hyperbranched polyurethane. Particular preference is for linear paraffin waxes. Similar systems, containing an organopolysiloxane in place of the wax component are described in DE 102007020790.

In DE 1017133 hydrophobic agents comprising a mixture of a hexamethylol melamine hexamethyl ether condensation product, stearic acid, stearic acid diglyceride and triethanolamine with paraffin are described.

Methods for the hydrophobic treatment of textiles by application of cross-linkable organopolysiloxanes are also known. The cross-linking can take place by condensation of Si—H- and Si—OH-functional organopolysiloxanes with the help of a catalyst as described in U.S. Pat. No. 4,098,701 for example. Cross-linking by addition of Si—H-functional organopolysiloxanes to SiC-bonded oleofinic radicals (see U.S. Pat. No. 4,154,714 and DE 3332997) is also possible. Because of the reactive nature of the organopolysiloxanes the production of preparations that are stable when stored is difficult, however. Often components can only be mixed immediately prior to use, making them cumbersome in practical usage.

EP 2152957 describes fluorocarbon polymer-free preparations based on organopolysiloxanes and polyurethanes, used for the water-repellent finishing of textiles.

The oleo- and hydrophobic agents for textiles described above are often formulated with blocked polyisocyanates for finishing. In case of blocked isocyanates the reactive isocyanate groups are reacted with protective groups, so that no reaction of the isocyanate group is noticed under normal storage conditions (e.g. 0-80° C.). By activating the blocked isocyanates, e.g. at a raised temperature (referred to as the de-blocking temperature, e.g. >80° C.) the protective group can be separated with the regeneration of the isocyanate group. The isocyanate groups obtained are able to cross-link the hydrophobic agent or to bond to the textile substrate, wherein the point in time of the cross-linking or bonding can be selected as desired by adjusting the activation conditions. Thus the effect level of materials finished in this way can be significantly increased, and the resistance to wear and washing improved considerably.

The most important compounds used in the textiles industry for blocking polyisocyanates are butanone oxime and 3,5-dimethylpyrazole. With butanone oxime predominantly aromatic polyisocyanates are blocked, since the resulting systems still have a de-blocking temperature that is acceptable to the finisher. A disadvantage of the aromatic compounds, however, is their strong tendency to yellowing on the textile. Furthermore, butanone oxime is classified as a potential carcinogen, meaning that corresponding safety precautions have to be taken when it is applied and activated.

Alternatively, 3,5-dimethylpyrazole is used as a blocking agent, which is in particular suitable for aliphatic polyisocyanates. Aromatic polyisocyanates, on the other hand, are rarely blocked with 3,5-dimethylpyrazole, because in this case the de-blocking temperature is too low in order to obtain stable aqueous preparations at ambient temperature. 3,5-dimethylpyrazole is also suspected of being harmful to health.

In DE 69927679 self-dispersing pyrazole derivate-blocked polyisocyanates are disclosed, which are used as an aid in the finishing of fibre materials with oleophobic and/or hydrophobic finishing agents. In order to ensure the dispersibility of the blocked polyisocyanates, these contain hydrophilic polyalkylene oxide groups. A disadvantage of the systems described is the hydrophilic group, which counteracts the desired water-repellent effect of the compound. Also a disadvantage is the protective group 3,5-dimethylpyrazole used, which has a high melting and boiling point, meaning that drying or condensing must be at very high temperatures condensed in order to ensure that no blocking agent remains on the textile. This should be avoided, since 3,5-dimethylpyrazole is suspected of being teratogenic. Investigations have shown, however, that a small residual quantity of 3,5-dimethylpyrazole basically remains on textiles finished in this way.

EP 2599848 describes a water- and oil-repellent composition, comprising a pyrazole-blocked polyisocyanate, a non-ionic surfactant and a water- and oil-repellent component. As stated above, any kind of pyrazole-containing blocking agents must be avoided.

EP 1375552 describes aqueous or water-reducible polyisocyanate blocked with secondary benzyl amines and used as crosslinkers in stove enamels. The blocked polyisocyanates contain a hydrophilic group, in order to be able to emulsify or disperse the compound in water. Cationic, anionic and/or non-ionogenic groups are incorporated in large quantities in the polymer as hydrophilising agents. Such systems are not suitable for use as cross-linkers for the hydrophobic treatment of textiles, since the hydrophilic groups exhibit a strong rewetting effect, meaning that the desired water-repelling effect cannot be achieved.

EP 1375551 describes polyisocyanates blocked with secondary benzyl amines, used as self-crosslinking single-component stoving systems.

The problem for the present invention is therefore to provide a preparation, conferring improved oleophobic and/or hydrophobic effects which is toxicologically safe.

This problem has been solved by the provision of a preparation containing
(i) at least one blocked polyisocyanate of formula (I)

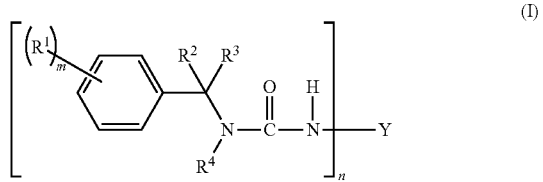

(I)

wherein
$R^1$ independently of one another is hydrogen, $C_1$-$C_4$-alkyl or $C_6$-$C_{10}$-cycloalkyl, preferably hydrogen,
$R^2$ independently of one another is hydrogen, $C_1$-$C_4$-alkyl or $C_6$-$C_{10}$-cycloalkyl, preferably hydrogen,
$R^3$ independently of one another is hydrogen, $C_1$-$C_4$-alkyl or $C_6$-$C_{10}$-cycloalkyl, preferably hydrogen,
$R^4$ independently of one another is $C_1$-$C_4$-alkyl, $C_6$-$C_{10}$-cycloalkyl or $C_7$-$C_{14}$-aralkyl, preferably methyl, ethyl, propyl, isopropyl, n-butyl, sec-butyl, tert-butyl, more preferably tert-butyl,
m is an integer selected from 1, 2, 3, 4 or 5,
n is a number between 2 and 10, preferably between 2 and 8, more preferably between 2 and 6, and
Y is a polyisocyanate radical, optionally substituted with a hydrophobic and/or anionic, cationic and/or non-ionic group; and
(ii) at least one oleophobic and/or hydrophobic finishing agent.

In a preferred embodiment $R^1$, $R^2$ and $R^3$ are in each case H and $R^4$ is tert-butyl.
Y is preferably an aliphatic cycloaliphatic and/or aromatic hydrocarbon radical having 6-200 carbon atoms, preferably 6-150 carbon atoms, more preferably 6-120 carbon atoms, optionally containing at least one urethane, allophanate, urea, biuret, uretdione, isocyanurate, carbodiimide, iminooxadiazindione and/or uretonimine group.

The blocked polyisocyanates can be obtained by reacting the benzylamine of formula (IV)

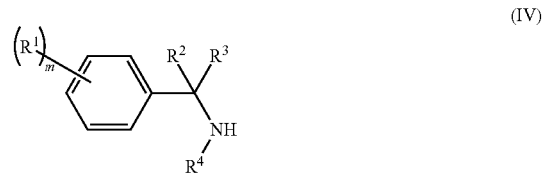

(IV)

with a polyisocyanate, wherein $R^1$-$R^4$, m and n are as defined above. Preferred benzylamine derivatives are N-methyl-, N-ethyl-, N-isopropyl-, N-propyl-, N-butyl-, N-isobutyl- and N-tert-butyl- and 1,1-dimethylbenzylamine. Tert-butyl-benzylamine is preferably used, in order to block the isocyanate groups of the polyisocyanate. In one embodiment the polyisocyanate can be blocked with various benzylamine derivatives of formula (IV).

A polyisocyanate within the meaning of the invention is considered to be a basic structure with at least two free isocyanate groups. The radical Y thus represents a basic structure of a polyisocyanate (without the blocked isocyanate groups —NHCO— benzylamine derivate). In a preferred embodiment Y is a basic structure of an aliphatic, cycloaliphatic or aromatic polyisocyanate. Preferred examples of aliphatic polyisocyanates are hexamethlyene diisocyanate, 2,2,4-trimethyl-hexamethylene diisocyanate and 2,4,4-trimethyl-hexamethylene diisocyanate, in particular hexamethylene diisocyanate.

Preferred cycloaliphatic polyisocyanates are isophorone diisocyanate, methylene-bis(4-cyclohexylisocyanate), 2,4-cyclohexyldiisocyanate and 2,6-cyclohexyldiisocyanate, in particular isophorone diisocyanate.

Preferred aromatic polyisocyanates are toluylene diisocyanate (e.g. 2,4-TDI or 2,6-TDI), (polymeric) diphenylmethane diisocyanate (e.g. 4,4'-MDI, 2,4'-MDI, 2,2'-MDI), naphthalene-1,5-diisocyanate (NDI), 4,4',4''-triisocyanatetriphenylmethane and tetraisocyanate, in particular toluylene diisocyanate and diphenylmethane diisocyanate.

For the radical Y as the basic structure conversion products of the abovementioned polyisocyanates can be used, which are preferably obtained by reacting part of the isocyanate groups of the polyisocyanates together, with monoalcohols, dialcohols, monamines, diamines, alcohol amines, water and/or carboxylic acids. Such oligomeric basic structures contain at least one urethane, allophanate, urea, biuret, uretdione, isocyanurate, carbodiimide, iminooxadiazindione and/or uretonimine-group. Basically the oligomeric reaction products must have at least two free isocyanate groups, which can then be reacted with benzylamine derivate (IV) to the blocked polyisocyanate (I).

Polyurethane prepolymers are preferably used as the basic structure. These are oligomeric products from reacting the abovementioned aromatic, aliphatic and/or cycloaliphatic polyisocyanates with polyvalent alcohols or polyvalent amines, such as, for example, trimethylolpropane, glycerine, $C_{1-12}$-diol and/or $C_{1-12}$-diamine. The reaction must be set so that the prepolymer has free isocyanate groups (NCO-prepolymer), which are then blocked with the benzylamine derivative and provide a blocked polyisocyanate of formula (I).

A basic structure of hexamethylene diisocyanate-trimerisate, hexamethylene diisocyanate-biuret or isophorone diisocyanate trimerisate can also be used as the radical Y.

Particularly preferably the radical Y is a basic structure of a hexamethylene diisocyanate trimerisate, hexamethylene diisocyanate biuret, isophorone diisocyanate trimerisate, an aliphatic, cycloaliphatic or aromatic polyisocyanate, a conversion product of the above polyisocyanate, preferably obtained by reacting part of the isocyanate groups of the polyisocyanate with one another, with monoalcohols, dialcohols, monoamines, diamines, alcohol amines, water and/or carboxylic acids or an NCO-prepolymer.

The radical Y can further be substituted with a hydrophobic and/or anionic, cationic and/or non-ionic group. Here the hydrophobic and/or anionic, cationic and/or non-ionic group is preferably bonded via a urethane and/or via a urea group to the radical Y.

The hydrophobic group is in particular a linear, cyclical or branched, saturated or at least partially unsaturated hydrocarbon radical with 8-24, preferably 12-22 carbon atoms. Here the hydrophobic group is preferably bonded via a urethane and/or via a urea group to the radical Y. The hydrophobic group is preferably introduced via the reaction of a fatty alcohol and/or fatty amine with an isocyanate group of the polyisocyanate. Preferred hydrophobic groups are thus octane, 2-ethylhexane, decane, isodecane, lauryl, isotridecane, myristyl, cetyl, stearyl and behenyl groups, preferably lauryl, isotridecane, myristyl, cetyl, stearyl and behenyl, in particular preferably lauryl, cetyl, stearyl, and behenyl groups. The proportion of hydrophobic groups preferably accounts for 2-20 mole percent, preferably 2-10 mole percent, with respect to the originally available free isocyanate groups in the polyisocyanate.

Furthermore, the radical Y can be substituted with an anionic, cationic and/or non-ionic group. These groups are preferably bonded via a urethane and/or a urea group to the radical Y of the polyisocyanate. The low proportions of anionic, cationic and/or non-ionic groups bring about an improved emulsion stability of the blocked polyisocyanate in applications with high shearing forces.

The cationic group preferably comprises a quaternary ammonium ion or an ammonium salt. The bonding of the cationic group to the radical Y normally takes place by reacting an isocyanate group of the polyisocyanate with a compound which, apart from a sec- or tert-amine or quaternary ammonium ion has an isocyanate-reactive hydrogen atom. Such compounds are preferably $C_{1-10}$-alkanol-sec/tert-amines, such as, for example, N-methyldiethanolamine and N,N-dimethylethanolamine. The secondary atoms can either be converted by protonation into the corresponding ammonium salts or quaternised by methylating agents such as, for example, dimethyl sulphate, methyl chloride, methyl tosylate or benzyl chloride. Preferred cationic groups are therefore -L-$R^5R^6H^+$ or -L-$NR^5R^6R^{7+}$, wherein L is a spacer. L is preferably $C_{1-10}$-alkyl, that is optionally substituted with OH. $R^5$, $R^6$ and $R^7$ are independently of one another H and $C_{1-6}$-Alkyl, optionally substituted with OH and/or COOH.

The anionic group preferably comprises a carboxylate and/or a sulphonate. The bonding of the anionic group to the radical Y usually takes place by reacting an isocyanate group of the polyisocyanate with a compound which, apart from a carboxylic acid and/or sulphonic acid group, has an isocyanate-reactive hydrogen atom. Such compounds are preferably amino acids, such as glycine and mono- or dihydroxycarboxylic acids, such as, for example, glycolic acid, dimethylolprionic acid and hydroxypivalic acid. The carboxylic acids can be converted by addition of a base, e.g. NaOH, KOH and/or tertiary amine to the carboxylate and/or sulphonate.

Preferred anionic groups are -L-$COO^-$ or -L-$SO_3^-$, wherein L is a spacer. L is preferably $C_{1-10}$-alkyl, optionally substituted with OH.

A polyalkylene oxide, preferably having a weight average molecular weight of 200-2,000 g/mol, preferably 400-1,000 g/mol is preferably used as the non-ionic group. Preferred polyalkylene oxides are methylpolyethylene glycol (MPEG), methylpolypropylene glycol or hybrids of the two, in particular methylpolyethylene glycol. The incorporation of the non-ionic group in the radical Y usually takes place by reacting an isocyanate group of the polyisocyanate with a polyalkylene oxide, having an isocyanate-reactive hydrogen atom.

The proportion of anionic, cationic and/or non-ionic preferably accounts for a proportion of 0-10 mole percent, preferably 0-7 mole percent, more preferably 0.01-7 mole percent, with respect to the originally available free isocyanate groups in the polyisocyanate. A higher proportion of anionic, cationic and/or non-ionic groups has a negative effect, since these groups counteract the hydrophobic effect.

In a preferred embodiment the blocked polyisocyanate has the formula (II)

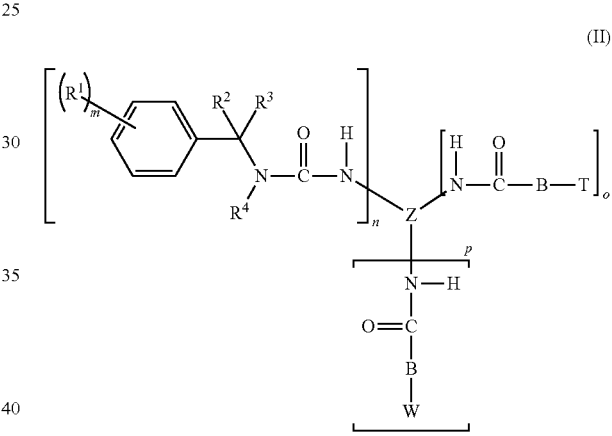

wherein
Z is a polyisocyanate radical,
T is a hydrophobic group,
W comprises a cationic, anionic and/or non-ionic group,
B is —O— and/or —NH—,
o is 0.1-4, preferably 0.1-1, and
p is 0-1, preferably 0.1-0.5.
Z corresponds to the radical Y defined above, which is necessarily substituted with a hydrophobic group. The substituents $R^1$ to $R^4$, m and n are as defined above. The hydrophobic group (T) is as defined above, wherein the hydrophobic group is bonded to Z via —B—CONH.

The substituent W containing the cationic, anionic and/or non-ionic group is as defined above and bonded to Z via —B—CONH. The substituent W containing the cationic group is preferably -L-$NR^5R^6H^+$ or -L-$NR^5R^6R^{7+}$, wherein L and $R^5$ to $R^7$ are as defined above.

The substituent W containing the anionic group is preferably -L-$COO^-$ or -L-$SO_3^-$, wherein L is as defined above.

The substituent W containing the non-ionic group is preferably a polyalkylene oxide as defined above, bonded via —B—CONH— to Z, wherein B is preferably —O—.

In a particular embodiment W comprises a non-ionic group.

Groups W and T can in each case be the same or different.

In a preferred embodiment the proportion of blocked polyisocyanate n accounts for 70-98%, preferably 80-95%, with respect to the total of n+o+p, that is to say 70-98% of the originally available free isocyanate groups in the polyisocyanate are blocked with benzyl amine derivative.

In a preferred embodiment the proportion of hydrophobic group o accounts for 2-20%, preferably 2-10% with respect to the total of n+o+p.

In a further embodiment the proportion of cationic, anionic and/or non-ionic group p accounts for 0-10%, preferably 0-7%, more preferably 0.1-7% with respect to the total of n+o+p.

The preparation according to the invention further comprises at least one oleophobic and/or hydrophobic finishing agent. The finishing agent used in the preparations according to the invention, necessary for achieving a water-repellent effect, can, or not, contain fluorine. To achieve an oleophobic effect, however, it is essential for the preparation to contain a fluoride-containing finishing agent.

In a preferred embodiment the oleophobic and/or hydrophobic finishing agent comprises at least one fluorocarbon polymer. The fluorocarbon polymers are preferably homo- or copolymers. In a preferred embodiment the fluorocarbon polymer contains at least one repeat unit of formula (III)

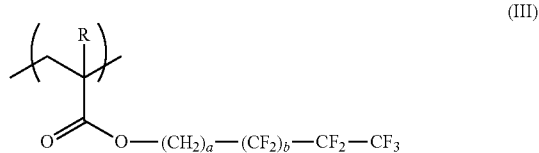

(III)

wherein
R is H or $CH_3$,
a is an integer from 0-6, preferably 2-4, more preferably 2 and
b an integer from 0-4, more preferably 4.

Linear, branched and/or cyclical $C_2$22-alkyl(meth)acrylates such as, for example, isobornyl (meth)acrylate, cyclohexyl (meth)acrylate, 2-ethylhexyl (meth)acrylate, isodecyl (meth)acrylate, lauryl (meth)acrylate, myristyl (meth)acrylate, cetyl (meth)acrylate, stearyl (meth)acrylate, behenyl (meth)acrylate, vinyl chloride, vinylidene chloride and/or styrene, in particular cetyl (meth)acrylate, stearyl (meth)acrylate, behenyl (meth)acrylate, vinyl chloride and/or vinylidene chloride can be used as comonomer of the perfluorinated (meth)acrylates according to formula (III).

Furthermore, comonomers can be used containing a cross-linkable group. Here a cross-linkable group is a functional group, able to react with the fabric to be finished and/or an external cross-linker (multifunctional compound). Examples of comonomers with a cross-linkable group are 2-hydroxyethyl (meth)acrylate, 3-hydroxypropyl (meth)acrylate, N-hydroxymethyl (meth)acrylamide, 3-chloro-2-hydroxypropyl (meth)acrylate, N-isobutoxy methylacrylamide, polyalkylene glycol mono(meth)acrylate, N-butoxymethyl acrylamide and glycidyl (meth)acrylate, preferably 2-hydroxyethyl (meth)acrylate, N-hydroxymethyl (meth)acrylamide, 3-chloro-2-hydroxypropyl (meth)acrylate, glycidyl (meth)acrylate, with particular preference for 2-hydroxyethyl (meth)acrylate, N-hydroxymethyl (meth)acrylamide and/or glycidyl (meth)acrylate.

The copolymers for oleophobic and/or hydrophobic finishing are normally produced by radical polymerisation using radical initiators, known to the person skilled in the art. Common radical initiators are azo compounds such as, for example, azobisisobutyro-nitrile, azobisvaleronitrile, 2,2'-azobis(2-amidinopropane) dihydrochloride, and 2,2'-azobis[2-(2-imidazolin-2-yl)propane] dihydrochloride, hydroperoxides such as, for example, cumene hydroperoxide and tert-butyl hydroperoxide, dialkyl peroxides such as di-tert-butyl peroxide and dicumene peroxide, peroxyesters such as, for example, tert-butyl perbenzoate, diacyl peroxide such as, for example, benzoyl peroxide and lauroyl peroxide, inorganic peroxides such as, for example, ammonium persulphate and potassium persulphate or a combination thereof with organic and inorganic metal compounds.

The polymerisation can take place in solution or by means of emulsion polymerisation. The copolymer is preferably produced by means of emulsion polymerisation. Here the monomers, water, surfactant, radical initiator and optionally further solvents such as, for example, alcohols (e.g. ethanol, isopropanol, butyl diglycol, propylene glycol, dipropylene glycol, tripropylene glycol), ethers (e.g. dipropylene monomethyl ether, tripropylene glycol monomethyl ether, dipropylene glycol monobutyl ether, dipropylene glycol dimethyl ether) and esters (such as, for example, propylene glycol monomethyl ether acetate), are mixed to form a pre-emulsion. The polymerisation is then usually initiated at a temperature of 40-90° C. under agitation. In order to control the chain length of the copolymers, chain regulators such as, for example, alkyl thiols can also be used. The solids content of the polymer dispersion on completion of polymerisation is 15-40 wt %. with respect to the overall mass. Non-ionic, anionic and/or cationic surfactants or mixtures thereof are used as the surfactants Preferred non-ionic surfactants are for example alkoxylation products of fatty acids, fatty acid esters, fatty acid amides, aliphatic alcohols and sugar derivatives.

Preference is for the use of ethoxylation products of linear or branched aliphatic alcohols having 6-22 carbon atoms, used alone or in a mixture. Cocamidopropyl betaine can be used as an amphoteric surfactant.

Examples of preferred cationic surfactants are given as quaternary ammonium salts, such as, for example, di-($C_{10}$-$C_{24}$)-alkyl dimethyl ammonium chloride, ($C_{10}$-$C_{24}$)-alkyl dimethyl ethyl ammonium chloride or bromide, ($C_{10}$-$C_{24}$)-alkyl trimethyl ammonium chloride or bromide, ($C_{10}$-$C_{24}$)-alkyl dimethyl benzyl ammonium chloride, alkyl methyl polyoxyethylene ammonium chloride, bromide or monoalkyl sulphate, salts of primary, secondary and tertiary amines having 8-24 C atoms with organic or inorganic acids, salts of ethoxylated primary and secondary fatty amines having 8-24 C atoms with organic or inorganic acids, imidazolinium derivates or esterquats. Preference is for the use of di-($C_{10}$-$C_{24}$)-alkyl dimethyl ammonium chloride, ($C_{10}$-$C_{24}$)-alkyl trimethyl ammonium chloride or bromide, salts of primary, secondary and tertiary fatty amines having 8-24 C atoms with organic or inorganic acids and esterquats.

Examples of anionic emulsifiers are fatty alcohol sulphates such as, for example, sodium lauryl sulphate, alkyl sulphonates such as, for example, sodium lauryl sulphonate, alkly benzene sulphonates, such as, for example, sodium dodecyl benzene sulphonate and fatty acid salts such as, for example, sodium stearate.

Furthermore, the hydrophobic finishing agents can also comprise fluorine-free finishing agents. Fluorine-free finishing agents are in particular natural and synthetic waxes, such as, for example, $C_{8-30}$-polyolephines, poly(meth)acrylates, such as, for example, poly(meth)-$C_{1-22}$-acrylates, polyurethanes, fatty-acid modified melamines, organopolysiloxanes, metal salts of fatty acids, fatty acid condensation products or combinations thereof.

It has been discovered that the hydrophobic or oleophobic finishing agents without the blocked polyisocyanate do not have sufficient wash resistance. This means that the range of properties of the materials treated with the hydrophobic and/or oleophobic finishing agents significantly deteriorates with each wash cycle. The combination of blocked polyisocyanate(s) and finishing agent(s) therefore does not only lead to improved initial effects, but also to a significantly greater wash resistance.

The preparations according to the invention can further contain at least one organic solvent, water or mixtures thereof. Suitable organic solvents are in particular water-soluble solvents, in particular glycols (e.g. butyl diglycol, propylene glycol, dipropylene glycol, tripropylene glycol), ethers (e.g. dipropylene monomethyl ether, tripropylene glycol monomethyl ether, dipropylene glycol monobutyl ether, dipropylene glycol dimethyl ether) and/or esters (e.g. propylene glycol monomethyl ether acetate).

The preparation according to the invention preferably takes the form of a dispersion, more preferably the form of an emulsion. The solids content of the dispersion is 20-40 wt. % with respect to the overall mass of the preparation.

In this case the preparation according to the invention can further contain surfactants or surfactant mixtures. The preparations preferably comprise at least one anionic, cationic and/or non-ionic surfactant. The surfactants used can in particular be those that are also used in the copolymerisation of the oleophobic/hydrophobic finishing agents (see above). The quantity of additional surfactant in the preparation is preferably 0-20, more preferably 0.1-15 wt. % with respect to the solids content of the preparation.

The preparation according to the invention contains the blocked polyisocyanate preferably in a proportion of 10-80%, preferably 20-70%, more preferably 30-60%, with respect to the solids content. The at least one oleophobic and/or hydrophobic finishing agent can be contained in the preparation according to the invention in a proportion of 15-90%, preferably 30-80% and more preferably 40-70%, with respect to the solids content.

In one embodiment the preparation according to the invention (e.g. an aqueous emulsion) comprises at least one blocked polyisocyanate according to formula (I) (e.g. 15-40 wt. %, preferably 20-40 wt. %, particularly preferably 20-30 wt. % with respect to the solids content), at least one fluorine-containing, in particular fluorocarbon polymer-containing, oleophobic and/or hydrophobic finishing agent (e.g. 15-40 wt. %, preferably 20-40 wt. %, particularly preferably 20-30 wt. % with respect to the solids content) and at least one fluorine-free hydrophobic finishing agent (e.g. 20-70 wt. %, preferably 20-60 wt. %, particularly preferably 40-60 wt. % with respect to the solids content).

In another embodiment the preparation according to the invention (e.g. an aqueous emulsion) comprises at least one blocked polyisocyanate according to formula (I) (e.g. 10-80 wt. %, preferably 20-70 wt. %, particularly preferably 30-60 wt. % with respect to the solids content) and at least one fluorine-containing, in particular fluorocarbon polymer-containing, oleophobic and/or hydrophobic finishing agent (e.g. 20-90 wt. %, preferably 30-80 wt. %, particularly preferably 40-70 wt. % with respect to the solids content).

In another embodiment the preparation according to the invention (e.g. an aqueous emulsion) comprises at least one blocked polyisocyanate according to formula (I) (e.g. 10-80 wt. %, preferably 20-70 wt. %, particularly preferably 30-60 wt. % with respect to the solids content) and at least one fluorine-free, in particular fluorocarbon polymer-free, hydrophobic finishing agent (e.g. 20-90 wt. %, preferably 30-80 wt. %, particularly preferably 40-70 wt. % with respect to the solids content). It should be noted that to achieve the oil-repellent effects the presence of a fluorine-containing oleophobic and/or hydrophobic finishing agent is essential and therefore this mixture merely creates a water-repellent effect on the textile.

A further object of the present invention is a blocked polyisocyanate according to formula (II)

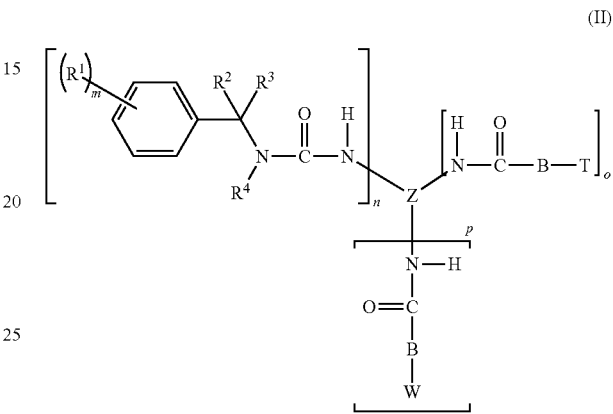

wherein Z, W, T, B, $R^1$-$R^4$, m, n, o and p are as defined above.

Another object of the present invention is a method of producing a blocked polyisocyanate of formula (II) comprising the steps of
(i) providing a polyisocyanate;
(ii) reacting the polyisocyanate with benzylamine of formula (IV)

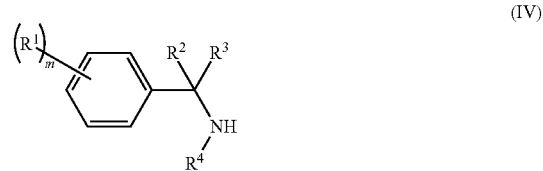

and a compound containing a hydrophobic and optionally a anionic, cationic and/or non-ionic group, containing an isocyanate-reactive hydrogen atom.

The method according to the invention preferably takes place in a one-pot process or by addition of the reactants one after the other. The polyisocyanate is preferably provided and then the benzylamine of formula (IV) and optionally amine(s) and/or alcohol(s) of the compound T and/or W are added one after the other.

In one embodiment the reaction can be performed in the presence of a non-protic solvent. Particularly preference is for solvents, which aid the emulsification of the blocked polyisocyanate, such as, for example, N-ethyl pyrrolidone or dipropylene glycol dimethyl ether. Other suitable solvents are for example ethyl methyl ketone, methyl propyl ketone, ethyl acetate, n-propyl acetate, i-propyl acetate, n-butyl acetate or i-butyl acetate. In order to accelerate the reaction catalysts, in particular tertiary amines, such as, for example, diazabicyclooctane or metal carboxylates, such as, for example, dibutyltin dilaurate or bismuth tris(2-ethylhexanoate) can also be used. Where present, the solvent can be distilled off in a further step.

Another object of the present invention is a method of producing the preparation according to the invention. For this the at least one blocked polyisocyanate and the at least one oleophobic and/or hydrophobic finishing agent and optionally at least one organic solvent, water or mixtures thereof and optionally at least one surfactant are mixed. Mixing takes place using suitable mechanical means, such as, for example, stirrers, Ultra-Turrax, dissolver disc, high-pressure, ultrasound homogeniser or other dispersion method known to the person skilled in the art. In a preferred embodiment, emulsions of the blocked polyisocyanates according to the invention are produced by initially forming a coarse-grained pre-emulsion, the droplets of which can then be reduced with the help of high-pressure homogenisers to small particle sizes. Following dispersion, any solvent residues present are removed by distillation.

A further aspect of the present invention is a kit comprising
(i) at least one blocked polyisocyanate of formula (I) and/or (II), as defined above, and
(ii) at least one oleophobic and/or hydrophobic finishing agent.

A further aspect of the present invention is the use of the preparation according to the invention or the compound (II) according to the invention or the kit according to the invention for oleophobic and/or hydrophobic finishing of fabrics, in particular textiles. Textiles within the meaning of the invention are in particular woven fabrics, knitted fabrics and non-wovens from natural fibres, such as, for example, wool or cotton or synthetic fibres, such as, for example, PES, PA and regenerated fibres or mixtures thereof.

A further object of the present invention is a method for finishing fabrics, in particular textiles, comprising the steps of
(a) providing the preparation according to the invention, or mixing the kit components (i) and (ii),
(b) applying the preparation or the mixtures obtained in step (a) to a fabric; and
(c) thermal treatment of the fabric.

The application of the preparation or mixture to the fabric in step (b) generally takes place in layers of 0.1-3 wt. %, preferably 0.1-2.5 wt. %, particularly preferably 0.1-2.0 wt. % of the solids content of the preparation or mixture with respect to the weight of the fabric to be treated. Normally for this purpose a liquor is produced in the desired concentration. The concentration of the liquor to be used is selected here such that in each case the desired application results. The liquor used can have other preparation agents added. Examples of additional preparation agents that can be considered are chemicals for crease-resistant finishing (e.g. methylol compounds of dihydroxyethylene urea or methylol melamine ether with varying degrees of methylolation), flame retarders or softeners.

The preparation or mixture is applied using common methods known to a person skilled in the art, such as by non-exhaust methods, exhaust methods, spraying, impregnation, slop padding, printing, coating or padding to the fabric.

In a preferred embodiment the preparation or mixture according to the invention is applied to the fabric by soaking in the liquor and then squeezing on the padding machine.

Drying and thermal treatment of the fabric obtained in step (b) takes place in step (c) preferably at temperatures of 130-170° C. The treatment preferably takes place in the stenter. As the stated temperatures the benzyl amine derivative protective group separates and evaporates. The resulting reactive isocyanate group reacts with isocyanate-reactive hydrogen atoms of the substrate and/or the other components, so that the components and/or the substrate at least partially crosslink with one another. The thermal treatment of the fabric preferably takes place in 0.5-10 minutes, particularly preferably in 1-5 minutes. The length of the thermal treatment here is also dependent upon the temperatures applied.

A further object of the present invention is such a fabric with an oleophobic and/or hydrophobic finishing, in particular a textile, obtainable by
(a) application of a preparation according to the invention or a mixture of the kit components (i) and (ii) to a fabric, in particular a textile and
(b) thermal treatment of the fabric.

It has been found that the preparations according to the invention provide the fabrics according to the invention with exceptional initial water/oil repellency and very good wash resistance. The de-blocking temperature of the blocked polyisocyanates and the boiling point of the blocking agent (benzylamine derivatives) are also comparatively low, ensuring that no residual quantities of blocking agent remain on the textile. It should also be noted that the benzylamine-derivatives used as protective groups are furthermore toxicologically safe.

EXAMPLES

The following examples explain the invention. Examples 1-4 describe the production of the blocked polyisocyanates according to the invention (dispersions 1-4). From the dispersions, preparations with oleo- and/or hydrophobic agents were formulated. Table 1 shows preparations 1-8 not according to the invention, Table 2 shows the preparations according to the invention 9-20. The application of the preparations to textile fabricswas performed on a laboratory padding machine type LFV 350/2, "RFA" (from Benz of Switzerland) with subsequent drying and thermal treatment on a laboratory stenter type TKF 15/M 350 (from Benz of Switzerland). Determination of the liquor absorption was by weighing the test sample before and after application of the finish.

Testing of the hydrophobic effects did not take place immediately after application, but only after conditioning of the substrate in the normal climate for 24 hours, in order to compensate for effects on these properties of over-drying. The quantities applied and the conditions of the thermal treatment are provided together with the result of the water-proofing measurement in Tables 3a and 3b.

The water repellency was tested on the textile fabrics using both the spray test according to AATCC Standard Test Method 22 and the significantly tougher differentiating "Bundesmann test" according to DIN 53 888. The test according to AATCC Standard Test Method 22 was performed by spraying distilled water under controlled conditions on the textile substrate under test and then visually comparing the crosslinking sample with images of an assessment standard provided in the test methods. The numerical values shown relate here to the appearance of the surface after spraying the water and have the following meaning:
100=no adhesion of drops of water or no wetting of the outer surface;
90=isolated adhesion of drops of water or wetting of the outer surface;
80=wetting of the outer surface at the points of impact of the water;

70=partial wetting of the entire outer surface;
50=complete wetting of the entire outer surface;
0=complete wetting of the entire outer and inner surface (wet through).

In the significantly tougher differentiating "Bundesmann test" according to DIN 53 888 the textile substrate under test is exposed to the influence of a defined artificial rain and the quantity of water absorbed after a certain length of time is determined as a percentage. In Tables 3a and 3b the quantity of water absorbed is referred to as "water absorption". Furthermore, the water beading effect referred to in Tables 3a and 3b as "beading effect" is used for assessment. This is rated by visual comparison of the irrigated test sample with the images shown in the DIN specification according to 5 scores, as defined below:
Score 5=small drops briskly roll off;
Score 4=formation of large drops;
Score 3=drops stick in places to the test sample;
Score 2=test sample partially wetted;
Score 1=entire surface of test sample wet through.

In order to test the resistance of the finished fabrics to washing processes, the test samples were washed in accordance with EN ISO 6330:2000 at 60° C. and dried at 70° C. in the tumble dryer.

To determine the yellowing, the finished cotton fabric (see Table 3a) was measured on the "texflash 2000" whiteness measuring device from "datacolor international" (Switzerland) according to Ganz-Griesser.

The following commercially available products were used:
Ruco-Guard TIE: solids content: 25%, aqueous emulsion of a butanone oxime-blocked aromatic polyisocyanate; Rudolf GmbH
Cassurit FF fl.: solids content: 40%, aqueous emulsion of a 3,5-dimethyl pyrazol-blocked aliphatic polyisocyanate; Clariant
Ruco-Guard AFB6 conc.: solids content: 27%, aqueous emulsion of an oleo- and hydrophobic agent with a fluorocarbon polymer-containing 2-(perfluorhexyl)ethyl methacrylate base, Rudolf GmbH
Ruco-Dry ECO: solids content: 20%, aqueous emulsion of a fluorocarbon polymer-free hydrophobic agent; Rudolf GmbH
Aduxol MPEG 750: polyethylene glycol monomethyl ether M=approximately 750 g/mol; Scharer and Schlafer AG
Aduxol MPEG 550: polyethylene glycol monomethyl ether M=approximately 550 g/mol; Scharer and Schlafer AG
Desmodur N 3300: aliphatic polyisocyanate (hexamethylene diisocyanate trimerisate); Bayer Material Science
Desmodular N 3200: aliphatic polyisocyanate (hexamethylene diisocyanate biuret); Bayer Material Science
Tolonate IDT 70 B: aliphatic polyisocyanate (isophorone diisocyanate trimerisate); Bayer Material Science
Lutensol TO 129: isotridecanol 12 EO; BASF
Arquad T 50: tallow fatty trimethylammonium Chloride Example 1 According to the Invention Aqueous Dispersion of a Tert.-butylbenzylamin Blocked Polyisocyanates; Dispersion 1

In a three-necked flask, equipped with a reflux condenser, adjustable stirrer and internal thermometer 65.0 g (337.2 mmol NCO) of Desmodur N3300 are dissolved under protective gas in 60.0 g dipropylene glycol dimethyl ether. 0.24 g of diazabicyclooctane and 4.85 g (18.0 mmol) stearyl alcohol are then added. The reaction mixture is stirred for 30 minutes at 55° C. 10.0 g (13.3 mmol) of Aduxol MPEG 750 and 0.14 g (7.8 mmol) of water are then added to the reaction mixture. After 1 hour at 55° C. the remaining NCO-groups are brought into reaction with 47.0 g (287.8 mol) of tert.-butyl benzyl amine. IR spectroscopy is used to check that the conversion is complete.

6.96 g of Lutensol TO 129 and 1.41 g of 60% acetic acid are then added. 330 g of distilled water are added in small amounts under vigorous stirring at 50° C., resulting in a fine-particle emulsion with a solids content of approximately 25%.

Example 2 According to the Invention

Aqueous Dispersion of a Tert.-butyl Benzylamine-blocked Polyisocyanate; Dispersion 2

In a three-necked flask, equipped with a reflux condenser, adjustable stirrer and internal thermometer 71.0 g (207.9 mmol NCO) of Tolonate IDT 70 B are dissolved under protective gas in 60 g of isopropyl acetate. 0.1 g of diazabicyclooctane, 4.0 g (12.3 mmol) of behenyl alcohol and 29.50 g (180.6 mmol) of tert.-butyl benzylamine are then added. The reaction mixture is stirred for 30 minutes at 75° C. 1.0 g (8.5 mmol) of 1,6-hexanediol are then added to the reaction mixture. After 1 hour at 75° C. IR spectroscopy is used to check that the conversion is complete. If this is the case cooling to 65° C. takes place.

In a separate beaker 5.0 g of Lutensol TO 12 and 3.0 g of Arquad T 50 are dissolved in 270 g of distilled water at 65° C.

Under vigorous stirring with an Ultra-Turrax the hot reaction mixture is slowly added to the aqueous emulsifier solution, resulting in a coarse-grained pre-emulsion. This is then homogenised at 65° C. on the high-pressure homogenising machine at 300-500 bar. Then the solvent is removed on the rotary evaporator by vacuum distillation.

Optionally the pH of the emulsion obtained is adjusted to 5-7 with acetic acid (60%), and the white emulsion obtained is filtered through a 20-micron filter and adjusted with water to a solids content of approximately 25%.

Example 3 According to the Invention

Aqueous Dispersion of a Tert.-butyl Benzylamine-blocked Polyisocyanate; Dispersion 3

In a three-necked flask, equipped with a reflux condenser, adjustable stirrer and internal thermometer 45.0 g (246.3 mmol NCO) of Desmodur N 3200 are dissolved under protective gas in 83 g of isopropyl acetate. 0.1 g of diazabicyclooctane, 3.5 g (18.8 mmol) of lauryl alcohol and 34.50 g (211.3 mmol) of tert.-butyl benzylamine are then added. The reaction mixture is stirred for 30 minutes at 75° C. 1.00 g (8.5 mmol) of 1,6-hexanediol are then added to the reaction mixture. After 1 hour at 75° C. IR spectroscopy is used to check that the conversion is complete. If this is the case cooling to 65° C. takes place.

In a separate beaker 3.0 g of Lutensol TO 129 and 5.0 g of Arquad T 50 are dissolved in 400 g of distilled water at 65° C.

Under vigorous stirring with an Ultra-Turrax the hot reaction mixture is slowly added to the aqueous emulsifier solution, resulting in a coarse-grained pre-emulsion. This is then homogenised at 65° C. on the high-pressure homogenising machine at 300-500 bar. Then the solvent is removed on the rotary evaporator by vacuum distillation.

Optionally the pH of the emulsion obtained is adjusted to 5-7 with acetic acid (60%), and the white emulsion obtained is filtered through a 20-micron filter and adjusted with water to a solids content of approximately 25%.

Example 4 According to the Invention

Aqueous Dispersion of a Tert.-butyl Benzylamine-blocked Polyisocyanate; Dispersion 4

In a three-necked flask, equipped with a reflux condenser, adjustable stirrer and internal thermometer 65.0 g (337.2 mmol NCO) of Desmodur N3300 are dissolved under protective gas in 100.0 g of acetone. 0.24 g of diazabicyclooctane and 5.9 g (31.7 mmol) of lauryl alcohol are now added. The reaction mixture is stirred for 30 minutes at 55° C. 7.9 g (14.4 mmol) of Aduxol MPEG 550 and 0.14 g (7.8 mmol) of water are then added to the reaction mixture. After 1 hour at 55° C. the remaining NCO-groups are brought into reaction with 45.0 g (275.6 mol) of tert.-butyl benzylamine. IR spectroscopy is used to check that the conversion is complete. The acetone is distilled off, leaving behind a viscous mass, to which 6.96 g of Lutensol TO 129 and 1.41 g of acetic acid (60%) are added. Under vigorous stirring 290 g of distilled water are then added in small amounts under vigorous stirring at 50° C. The result is a fine-particle emulsion with a solids content of approximately 25%.

TABLE 1

Preparations 1-8 not according to the invention

|  | Preparation 1 not according to the invention | Preparation 2 not according to the invention | Preparation 3 not according to the invention | Preparation 4 not according to the invention | Preparation 5 not according to the invention | Preparation 6 not according to the invention | Preparation 7 not according to the invention | Preparation 8 not according to the invention |
|---|---|---|---|---|---|---|---|---|
| Ruco-Guard TIE | 34% |  | 25% |  | 34% |  |  |  |
| Cassurit FF fl. |  | 21% |  | 16% |  | 21% |  |  |
| Ruco-Guard AFB6 | 66% | 66% | 50% | 50% |  |  | 100% |  |
| Ruco-Dry ECO |  |  | 25% | 25% | 66% | 66% |  | 100% |
| Distilled water |  | 13% |  | 9% |  | 13% |  |  |
| TOTAL | 100% | 100% | 100% | 100% | 100% | 100% | 100% | 100% |

TABLE 2

Preparations 9-20 according to the invention

|  | Preparation 9 according to the invention | Preparation 10 according to the invention | Preparation 11 according to the invention | Preparation 12 according to the invention | Preparation 13 according to the invention | Preparation 14 according to the invention |
|---|---|---|---|---|---|---|
| Ruco-Guard AFB6 conc. | 66% | 66% | 66% | 66% | 50% | 50% |
| Ruco-Dry ECO |  |  |  |  | 25% | 25% |
| Dispersion 1 | 34% |  |  |  | 25% |  |
| Dispersion 2 |  | 34% |  |  |  | 25% |
| Dispersion 3 |  |  | 34% |  |  |  |
| Dispersion 4 |  |  |  | 34% |  |  |
| Distilled water |  |  |  |  |  |  |
| TOTAL | 100% | 100% | 100% | 100% | 100% | 100% |

|  | Preparation 15 according to the invention | Preparation 16 according to the invention | Preparation 17 according to the invention | Preparation 18 according to the invention | Preparation 19 according to the invention | Preparation 20 according to the invention |
|---|---|---|---|---|---|---|
| Ruco-Guard AFB6 conc. | 50% | 50% |  |  |  |  |
| Ruco-Dry ECO | 25% | 25% | 66% | 66% | 66% |  |
| Dispersion 1 |  |  | 34% |  |  |  |
| Dispersion 2 |  |  |  | 34% |  |  |
| Dispersion 3 | 25% |  |  |  | 34% |  |
| Dispersion 4 |  | 25% |  |  |  | 34% |
| Distilled water |  |  |  |  |  |  |
| TOTAL | 100% | 100% | 100% | 100% | 100% | 100% |

TABLE 3a

Non-exhaust applications on poplin cotton, white, 155 g/m²

| | Preparation (Z) according to Table 2 | 1# | 2# | 3# | 4# | 5# | 6# | 7# | 8# | 9 | 10 | 11 | 12 | 13 | 14 | 15 | 16 | 17 | 18 | 19 | 20 | Untreated |
|---|---|---|---|---|---|---|---|---|---|---|---|---|---|---|---|---|---|---|---|---|---|---|
| Original | AATCC Standard Test Method 22 | 100 | 100 | 100 | 100 | 100 | 100 | 100 | 90 | 100 | 100 | 100 | 100 | 100 | 100 | 100 | 100 | 100 | 100 | 100 | 100 | No effect |
| | DIN 53 888 Beading effect | 5 | 4 | 4 | 3 | 3 | 3 | 3 | n.d. | 5 | 5 | 5 | 5 | 5 | 4 | 4 | 5 | 5 | 3 | 3 | 5 | |
| | DIN 53 888 Water absorption in % | 13 | 19 | 17 | 24 | 22 | 24 | 20 | n.d. | 14 | 16 | 15 | 13 | 15 | 14 | 20 | 10 | 14 | 25 | 23 | 15 | |
| | AATCC Standard Test Method 118 | 5 | 5 | 5 | 4 | 0 | 0 | 4 | 0 | 5 | 5 | 5 | 5 | 5 | 5 | 5 | 5 | 0 | 0 | 0 | 0 | |
| | Degree of whiteness (Ganz-Griesser) | 198 | 219 | 199 | 216 | 200 | 215 | 219 | 217 | 221 | 217 | 215 | 218 | 219 | 217 | 214 | 215 | 219 | 219 | 215 | 216 | 215 |
| After 3 × 60° washes | AATCC Standard Test Method 22 | 100 | 100 | 100 | 100 | 100 | 100 | 100 | 90 | 100 | 100 | 100 | 100 | 100 | 100 | 100 | 100 | 100 | 100 | 100 | 100 | |
| | DIN 53 888 Beading effect | 4 | 3 | 3 | 1 | 1 | 1 | 1 | n.d. | 5 | 4 | 4 | 5 | 5 | 4 | 4 | 5 | 5 | 3 | 3 | 4 | |
| | DIN 53 888 Water absorption in % | 19 | 22 | 23 | 36 | 34 | 41 | 39 | n.d. | 16 | 19 | 19 | 15 | 18 | 19 | 22 | 16 | 18 | 27 | 25 | 19 | |
| | AATCC Standard Test Method 118 | 4 | 4 | 3 | 3 | 0 | 0 | 3 | 0 | 5 | 5 | 4 | 5 | 4 | 5 | 4 | 5 | 0 | 0 | 0 | 0 | |

* = according to EN ISO 6330:2000;
, = not according to the invention;
n.d. = not determined;
Quantity of preparation used: 40 g/l of water;
Liquor absorption: 80%;
Drying and condensation: 2 minutes at 150° C.

TABLE 3b

Non-exhaust application on polyester fabric, beige, 90 g/m²

| | Preparation (Z) according to Table 2 | 1# | 2# | 3# | 4# | 5# | 6# | 7# | 8# | 9 | 10 | 11 | 12 | 13 | 14 | 15 | 16 | 17 | 18 | 19 | 20 | Untreated |
|---|---|---|---|---|---|---|---|---|---|---|---|---|---|---|---|---|---|---|---|---|---|---|
| Original | AATCC Standard Test Method 22 | 100 | 100 | 100 | 100 | 100 | 100 | 100 | 100 | 100 | 100 | 100 | 100 | 100 | 100 | 100 | 100 | 100 | 100 | 100 | 100 | No effect |
| | DIN 53 888 Beading effect | 5 | 5 | 5 | 4 | 4 | 4 | 3 | 1 | 5 | 5 | 5 | 5 | 5 | 5 | 5 | 5 | 4 | 5 | 5 | | |
| | DIN 53 888 Water absorption in % | 3 | 5 | 6 | 10 | 12 | 9 | 21 | 37 | 2 | 2 | 3 | 2 | 3 | 4 | 6 | 3 | 3 | 11 | 7 | 3 | |
| | AATCC Standard Test Method 118 | 5 | 5 | 5 | 4 | 0 | 0 | 4 | 0 | 5 | 5 | 5 | 5 | 5 | 5 | 5 | 5 | 0 | 0 | 0 | 0 | |
| After 3 × 60° washes | AATCC Standard Test Method 22 | 100 | 100 | 100 | 100 | 100 | 100 | 100 | 90 | 100 | 100 | 100 | 100 | 100 | 100 | 100 | 100 | 100 | 100 | 100 | 100 | |
| | DIN 53 888 Beading effect | 5 | 5 | 5 | 4 | 4 | 3 | 3 | n.d. | 5 | 5 | 5 | 5 | 5 | 5 | 5 | 5 | 4 | 4 | 5 | | |
| | DIN 53 888 Water absorption in % | 8 | 8 | 10 | 15 | 13 | 20 | 22 | n.d. | 1 | 1 | 1 | 1 | 1 | 3 | 5 | 1 | 2 | 3 | 5 | 2 | |
| | AATCC Standard Test Method 118 | 5 | 5 | 5 | 4 | 0 | 0 | 4 | 0 | 5 | 5 | 5 | 5 | 5 | 5 | 5 | 5 | 0 | 0 | 0 | 0 | |

* = according to EN ISO 6330:2000;
# = not according to the invention:
n.d. = not determined;
Quantity of preparation used: 40 g/l of water;
Moisture absorption: 60%;
Drying and condensation: 2 minutes at 150° C.

Tables 3a/3b shows that oleo- and/or hydrophobic agents without the addition of a blocked polyisocyanate, both on cotton and on polyester, exhibit a modest initial level of effectiveness (see Tables 3a/3b, preparations 7 and 8 not according to the invention). Through the addition of an aromatic butanone oxime-blocked polyisocyanate (RUCO-GUARD TIE) the oil and/or water repellency both on the primary samples and on the washed samples is good (preparations not according to the invention 1, 3 and 5). Looking at the degree of whiteness of the finished cotton fabric, however, a significant deterioration with these preparations is noticeable. So these preparations are not suitable for white and light goods. Alternative dimethylpyrazol-blocked polyisocyanates (Cassurit FF fl.) in the preparations not according to the invention lead to an improvement in the oil and/or water repellency in the primary fabric, but the wash resistance under the selected drying conditions is unsatisfactory.

The preparations according to the invention 9-20 demonstrate on cotton and polyester an exceptional initial level of effectiveness. The textiles finished with the preparations according to the invention, even after multiple washes, still have very good oil and/or water repellent effects. Compared with the butanone oxime- and dimethylpyrazol-blocked polyisocyanates used in the state of the art, with the preparations according to the invention even at moderate drying temperatures very good results are obtained. The samples according to the invention are also toxicologically safe and exhibit no yellowing.

The invention claimed is:

1. Preparation comprising:
(i) at least one blocked polyisocyanate of formula (II)

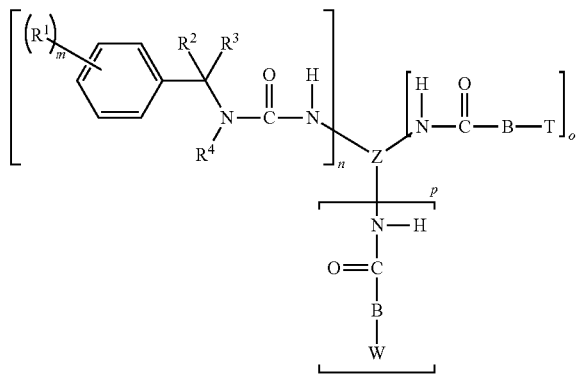

wherein
Z is a polyisocyanate radical,
T is a hydrophobic group,
W comprises a cationic, anionic or non-ionic group,
B is —O— and/or —NH—,
o is 0.1-4,
p is 0-1,
$R^1$ independently of one another is hydrogen, $C_1$-$C_4$-alkyl or $C_6$-$C_{10}$-cycloalkyl,
$R^2$ independently of one another is hydrogen, $C_1$-$C_4$-alkyl or $C_6$-$C_{10}$-cycloalkyl,
$R^3$ independently of one another is hydrogen, $C_1$-$C_4$-alkyl or $C_6$-$C_{10}$-cycloalkyl,
$R^4$ independently of one another is $C_1$-$C_4$-alkyl, $C_6$-$C_{10}$-cycloalkyl or $C_7$-$C_{14}$-aralkyl,
m is an integer selected from 1, 2, 3, 4 or 5, and
n is a number between 2 and 10, wherein n=70-98% with respect to the total of n+o+p; and
(ii) at least one oleophobic and/or hydrophobic finishing agent.

2. Preparation according to claim 1, wherein p=0-10% with respect to the total of n+o+p.

3. Preparation according to claim 1, wherein o=2-20% with respect to the total of n+o+p.

4. Preparation according to claim 1, wherein the oleophobic and/or hydrophobic finishing agent comprises at least one fluorocarbon polymer.

5. Preparation according to claim 4, wherein the fluorocarbon polymer comprises at least one repeat unit of formula (III)

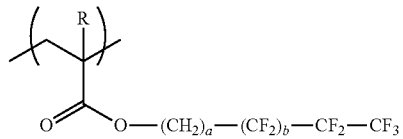

wherein
R is H or $CH_3$
a is an integer from 0-6, and
b is an integer from 0-6.

6. Preparation according to claim 1, wherein the hydrophobic finishing agent is fluorine-free.

7. Preparation according to claim 6, wherein the fluorine-free hydrophobic finishing agent contains wax, poly(meth)acrylate, polyurethane, fatty acid-modified melamine, organopolysiloxane, metal salt of fatty acids, fatty acid condensation products or mixtures thereof.

8. Preparation according to claim 1, wherein the preparation further comprises at least one organic solvent, water or mixtures thereof.

9. Preparation according to claim 1, wherein the preparation is an emulsion.

10. Preparation according to claim 1, further comprising at least one anionic, cationic and/or non-ionic surfactant.

11. Preparation according to claim 1, wherein the preparation contains the blocked polyisocyanate in a proportion of 10%-80% by weight, with respect to the solids content.

12. Preparation according to claim 1, wherein the preparation contains the oleophobic and/or hydrophobic finishing agent in a proportion of 15%-90% by weight, with respect to the solids content.

13. Method for finishing fabrics, comprising:
(a) providing a preparation according to claim 1;
(b) applying the preparation to a fabric; and
(c) thermally treating the fabric.

14. Oleophobically and/or hydrophobically finished fabric, obtained by the method of claim 13.

15. Kit comprising a preparation as claimed in claim 1.

16. Blocked polyisocyanate of formula (II)

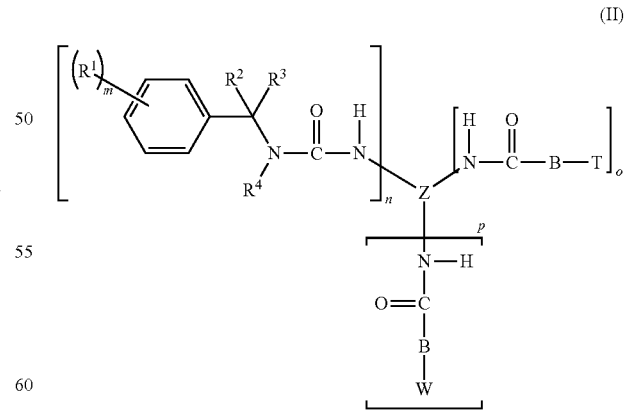

wherein
Z is a polyisocyanate radical,
T is a hydrophobic group,
W comprises a cationic, anionic or non-ionic group,
B is —O— and/or —NH—, o is 0.1-4,
p is 0-1,
$R^1$ independently of one another is hydrogen, $C_1$-$C_4$-alkyl or $C_6$-$C_{10}$-cycloalkyl,
$R^2$ independently of one another is hydrogen, $C_1$-$C_4$-alkyl or $C_6$-$C_{10}$-cycloalkyl,
$R^3$ independently of one another is hydrogen, $C_1$-$C_4$-alkyl or $C_6$-$C_{10}$-cycloalkyl,
$R^4$ independently of one another is $C_1$-$C_4$-alkyl, $C_6$-$C_{10}$-cycloalkyl or $C_7$-$C_{14}$-aralkyl,
m is an integer selected from 1, 2, 3, 4 or 5, and
n is a number between 2 and 10, wherein n=70-98% with respect to the total of n+o+p.

17. Method of producing a blocked polyisocyanate of formula (II)

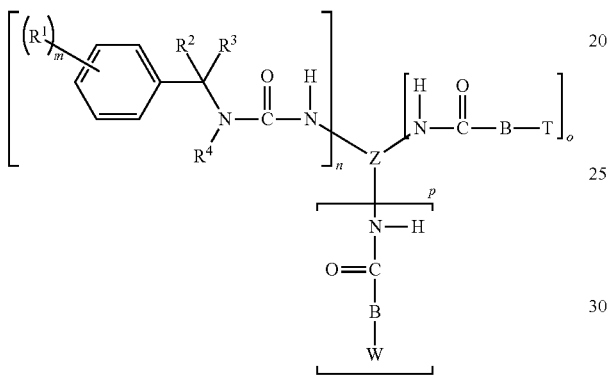

(II)

wherein
Z is a polyisocyanate radical,
T is a hydrophobic group,
W comprises a cationic, anionic or non-ionic group,
B is —O— and/or —NH—,
o is 0.1-4,
p is 0-1,
$R^1$ independently of one another is hydrogen, $C_1$-$C_4$-alkyl or $C_6$-$C_{10}$-cycloalkyl,
$R^2$ independently of one another is hydrogen, $C_1$-$C_4$-alkyl or $C_6$-$C_{10}$-cycloalkyl,
$R^3$ independently of one another is hydrogen, $C_1$-$C_4$-alkyl or $C_6$-$C_{10}$-cycloalkyl,
$R^4$ independently of one another is $C_1$-$C_4$-alkyl, $C_6$-$C_{10}$-cycloalkyl or $C_7$-$C_{14}$-aralkyl,
m is an integer selected from 1, 2, 3, 4 or 5, and
n is a number between 2 and 10, wherein n=70-98% with respect to the total of n+o+p, the method comprising:
(i) providing a polyisocyanate;
(ii) reacting the polyisocyanate with a benzylamine of formula (IV)

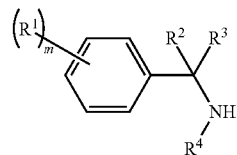

(IV)

wherein
$R^1$ independently of one another is hydrogen, $C_1$-$C_4$-alkyl or $C_6$-$C_{10}$-cycloalkyl,
$R^2$ independently of one another is hydrogen, $C_1$-$C_4$-alkyl or $C_6$-$C_{10}$-cycloalkyl,
$R^3$ independently of one another is hydrogen, $C_1$-$C_4$-alkyl or $C_6$-$C_{10}$-cycloalkyl,
$R^4$ independently of one another is $C_1$-$C_4$-alkyl, $C_6$-$C_{10}$-cycloalkyl or $C_7$-$C_{14}$-aralkyl, and
m is an integer selected from 1, 2, 3, 4 or 5; and
(iii) reacting the polyisocyanate with:
  a) a compound containing a hydrophobic group containing an isocyanate-reactive hydrogen atom, and
  b) optionally a compound containing an anionic group containing an isocyanate-reactive hydrogen atom, or
  c) optionally a compound containing a cationic group containing an isocyanate-reactive hydrogen atom, or
  d) optionally a compound containing a non-ionic group containing an isocyanate-reactive hydrogen atom.

* * * * *